Patented Apr. 17, 1951

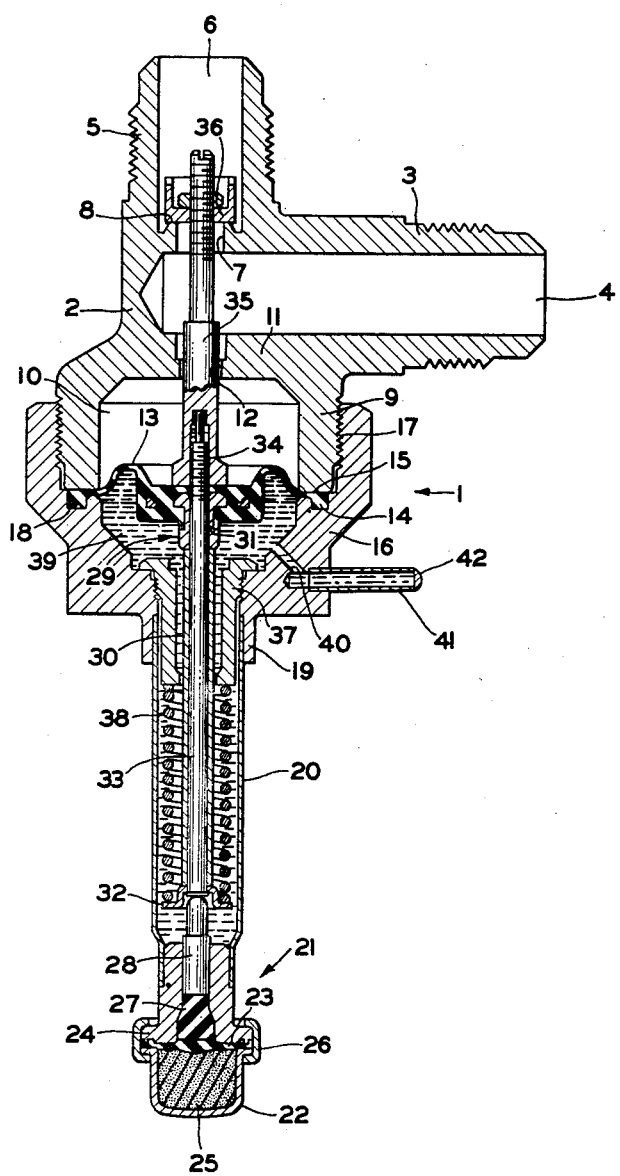

2,548,878

UNITED STATES PATENT OFFICE 2,548,878

THERMOSTATIC VALVE HAVING SEALING DIAPHRAGM AND SUPPORTING MEANS THEREFOR

Earnest J. Dillman, Detroit, Mich., assignor to Detroit Lubricator Company, Detroit, Mich., a corporation of Michigan Application December 30, 1948, Serial No. 68,245

4 Claims. (Cl. 236—99)

1

This invention relates to new and useful improvements in thermostatically operated valves and more particularly to valves having sealing diaphragms therein.

One of the objects of this invention is to provide a new and improved thermostatically operated flow controlling valve.

Another object is to provide a thermostatic flow controlling valve having a sealing diaphragm and novel supporting means therefor.

Another object is to provide a thermostatic flow controlling valve having a rubber or rubber-like sealing diaphragm and having means to support said diaphragm against rupture due to fluid line pressure.

Other objects will become apparent from time to time throughout the specification and claims as hereinafter related.

This invention comprises the new and improved construction and combination of parts and their cooperative relationship to each other which will be described more fully hereinafter and the novelty of which will be particularly pointed out and distinctly claimed.

In the accompanying drawing to be taken as part of this specification there is clearly and fully illustrated one preferred embodiment of this invention, in which drawing the figure shown is a view in longitudinal section of a thermostatically operated valve having a sealing diaphragm and embodying one form of this invention.

Referring to the drawing by characters of reference there is shown a valve generally designated as 1 which comprises a valve casing 2 having a laterally extending hollow projection 3 which provides an inlet passageway 4. The casing 2 has a longitudinally extending hollow projection 5 which provides an outlet passageway 6, which passageway intersects and communicates with the inlet passageway 4 through a port or aperture 7. There is an annular groove at the end of the passageway 6 adjacent the port 7 which provides a valve seat 8. The casing 2 has an enlarged portion 9 on the opposite side from the outlet projection portion 5 which has a cylindrical recess 10 therein. There is a wall 11 which separates the cylindrical recess 10 from the inlet passageway 4 and through which extends an aperture or passageway 12 interconnecting the recess 10 and the passageway 4, the aperture 12 being alined with the valve port 7. There is a flexible diaphragm 13 of an elastomeric material which closes the open end of the recess 10 and has its outer periphery 14 seated against the end 15 of the enlarged casing portion 9. The term elastomeric as applied to the diaphragm 13 is intended to be a generic term covering rubber, synthetic rubber or other organic or silico-organic elastic materials. There is a hollow closure member 16 which fits over the enlarged casing portion 9 and is screw-threadedly connected thereto as at 17. The closure member 16 has an annular shoulder or recess 18 which secures the outer periphery 14 of the diaphragm 13 against the end portion 15 of the enlarged casing portion 9. The closure member 16 has a projecting hollow sleeve portion 19 which is alined with the aperture 12 and which has secured and sealed therein one end of a tubular member 20. The tubular member 20 has secured and sealed in its other end a thermal expansive power element generally designated as 21. The power element 21 is of a type generally known as a "Vernatherm" element and comprises a cup-shaped member 22 closed by a flexible diaphragm 23 of elastomeric material and a sleeve member 24 and enclosing a thermal expansive material 25, the cup 22, diaphragm 23 and sleeve 24 being secured together by an annular sealing ring 26. The expansion of the material 25 against the diaphragm 23 is transmitted through a sealing and force transmitting plug 27 of elastomeric material to an actuating plunger 28. There is a valve operating stem generally designated as 29 which comprises a sleeve member 30 which at its upper end abuts a flanged insert member 31 molded into the central portion of the diaphragm 13. There is a dish-shaped spring supporting member 32 which abuts the end of the sleeve 30 adjacent the plunger 28 and is held in position by the flanged end of a rod 33. The rod 33 extends through the sleeve 30 and through the diaphragm 13 and is screw-threadedly connected as at 34 to a stem portion 35 which carries on its end a valve member 36. The rod 33 also serves to hold the supporting member 32, sleeve 30 and insert member 31 tightly together and to compress the stem portion 35 against the diaphragm 13 to seal the central opening therethrough. There is a sleeve member 37 which is screw-threadedly held in the end of the closure member 16 and which extends into the tubular member 20. There is a helical valve return spring 38 which is compressively positioned between the projecting end of the sleeve 37 and the peripheral edge of the dish-shaped member 32. The diaphragm 13, closure member 16, tubular member 20 and power element 21 enclose a chamber 39 which is filled completely with a liquid to provide support for the diaphragm 13. The filling of the chamber 39 is accomplished through a filler passageway 40 and filler tube 41 which is sealed as by solder as at 42. The liquid which fills the chamber 39 may be any suitable liquid such as water, oil or alcohol provided that it is not a liquid which will attack the diaphragm material.

The operation of this valve is as follows: The valve shown herein is operable to be opened by the rise of temperature of the power element 21. Upon rise of power element temperature the operating plunger 28 acting through the valve operating rod 29 moves the valve member 36 away from the valve seat 8 to permit flow through the passageways 4 and 6. The diaphragm 13 which seals the chamber 10 is provided to shield the power element 21 and to prevent circulation of fluid from the passageway 4 into heat exchange contact with the power element 21. When the fluid flowing through the valve is a heating or cooling liquid, the power element 21 unless shielded therefrom by the diaphragm 13 would be prevented from having an accurate response to its surrounding temperature.

While it is generally recognized to be old to provide a sealing bellows or diaphragm made of metal to prevent circulation of fluid to a thermostatic power element, it has heretofore been impracticable to use a rubber diaphragm because of the susceptibility to rupture when used with high fluid line pressures. It is desirable to use a rubber diaphragm in place of a metal diaphragm or metal bellows because of the saving in cost of manufacture but, as was pointed out, rubber diaphragms have been impracticable heretofore.

By filling the chamber 39 with liquid a firm solid backing support is provided for the rubber diaphragm 13 which prevents rupture thereof by fluid line pressure. The diaphragm 13 will be held, during operation of the valve, by the fluid line pressure compressed against the surface of the liquid which fills the chamber 39 and so will be unaffected by the pressure of fluid or liquid flowing through the valve. As the valve stem 29 is moved in the opening of the valve the central portion of the diaphragm 13 moves upward but the outer portions of the diaphragm are flexed downward to maintain a constant contact with the surface of the liquid in the chamber 39 thereby providing a solid support for the diaphragm 13 at all stages of the movement thereof.

Having thus described the invention what is claimed and desired to be secured by Letters Patent of the United States is:

1. A thermostatically operated valve for controlling flow of fluid under pressure comprising a valve casing having an inlet and an outlet and an interconnecting passageway, a movable valve member in said passageway for controlling flow of fluid therethrough and having a valve stem, a thermostatic power element operatively connected to said valve stem for moving the same, a flexible diaphragm of an elastomeric material interposed between said power element and said valve member and sealed to and movable with said stem and shielding said power element from the path of fluid circulating through said valve, liquid means interposed between said diaphragm and said power element and providing a solid backing support for said diaphragm to prevent rupture thereof by fluid line pressure, and said diaphragm having excess material forming a corrugation operable to be flexed against said liquid means and to maintain contact therewith throughout the entire range of movement of said valve stem by said power element.

2. A thermostatically operated valve for controlling flow of fluid under pressure comprising a valve casing having an inlet and an outlet and an interconnecting passageway, a movable valve member in said passageway for controlling flow of fluid therethrough and having a valve stem, a thermostatic power element operatively connected to said valve stem for moving the same, a flexible diaphragm of an elastomeric material interposed between said power element and said valve member and sealed to and movable with said stem and shielding said power element from the path of fluid circulating through said valve, said casing having a portion back of said diaphragm enclosing and sealing a space between said diaphragm and said power element through which extends said valve stem, said space being completely filled with liquid which is operable to support said diaphragm to prevent rupture thereof by fluid line pressure, and said diaphragm having excess material forming a corrugation operable to be flexed against said liquid and to maintain contact therewith throughout the entire range of movement of said valve stem by said power element.

3. A thermostatically operated valve for controlling flow of fluid under pressure comprising a valve casing having a laterally extending hollow projection forming an inlet passageway and a longitudinally extending hollow projection forming an intersecting outlet passageway, a valve seat in said outlet passageway, an enlarged portion on said casing opposite said outlet projection and having a cylindrical recess therein, said casing having an aperture from said recess into said inlet passageway alined with said valve seat, a flexible diaphragm of an elastomeric material closing the open end of said recess, a hollow closure member secured at one end to said casing enlarged portion and sealing the periphery of said diaphragm in place and forming with said diaphragm an enclosed chamber, a thermostatic power element carried by the other end of said closure member and sealed thereto; a valve operating stem abutting said power element and extending therefrom through said chamber, said diaphragm, and said aperture into said outlet passageway and carrying on its end a valve member cooperable with said valve seat; said diaphragm being secured and sealed at its central portion to said stem and operable to shield said power element from heat exchange contact with the fluid circulating through said casing, said chamber being completely filled with liquid to provide support for said diaphragm to prevent rupture thereof by fluid line pressure, and said diaphragm having excess material forming a corrugation operable to be flexed against said liquid and to maintain contact therewith throughout the entire range of movement of said valve stem by said power element.

4. A thermostatically operated valve for controlling flow of fluid under pressure comprising a valve casing having a hollow laterally extending projection forming an inlet passageway and a longitudinally extending hollow projection forming an intersecting outlet passageway, said outlet passageway having an annular shoulder forming a valve seat at the intersection of said passageways, said casing having an enlarged portion opposite said outlet projection and having a cylindrical recess therein, said casing having an aperture through the wall thereof from said recess to said inlet passageway and alined with said outlet passageway, a hollow closure member fitting over and secured to said casing enlarged portion and having an annular shoulder alined with the end thereof and a projecting sleeve portion alined with said aperture, a tubular member secured and sealed at one end in said sleeve portion and carrying on its other end a thermostatic power element, said power element being of the thermal expansive type and having an operating plunger extending into said tubular member other end, a sleeve member secured in said closure member and extending into said one end of said tubular member, a flexible diaphragm of an elastomeric material secured and sealed at its periphery between the end of said casing enlarged portion and said closure member annular shoulder; a valve operating stem abutting said power element plunger at one end and extending through said tubular member, said sleeve member, said diaphragm, said aperture, and said inlet passageway into said outlet passageway and carrying on its other end a valve member cooperable with said valve seat; said diaphragm being secured and sealed at its central portion to said valve operating stem and operable to shield said power element from heat exchange contact with the fluid circulating through said valve casing, a dish-shaped collar member carried by the plunger abutting end of said valve operating stem, a helical valve return spring compressively positioned between said collar member and the projecting end of said sleeve member and surrounding said valve operating stem; said diaphragm, said closure member, said tubular member, and said power element enclosing and sealing a chamber; a sealed filling passageway through said closure member into said chamber, and said chamber being completely filled with liquid to provide support for said diaphragm to prevent rupture thereof by fluid line pressure.

EARNEST J. DILLMAN.

REFERENCES CITED

The following references are of record in the file of this patent:

UNITED STATES PATENTS

| Number | Name | Date |
|---|---|---|
| 897,730 | Fulton | Sept. 1, 1908 |
| 1,601,444 | Higler | Sept. 28, 1926 |
| 1,632,125 | French | June 14, 1927 |
| 2,019,144 | Leonard | Oct. 29, 1935 |
| 2,118,292 | Booth | May 24, 1938 |
| 2,400,048 | Jones | May 7, 1946 |